April 17, 1945. G. A. FINGADO ET AL Re. 22,631

MACHINE FOR TREATING THIN RUBBER ARTICLES

Original Filed July 1, 1939 6 Sheets-Sheet 1

INVENTORS
GUSTAV A. FINGADO
AND HANS LUDWIG
BY
Joseph Montgomery
ATTORNEY.

April 17, 1945. G. A. FINGADO ET AL Re. 22,631
MACHINE FOR TREATING THIN RUBBER ARTICLES
Original Filed July 1, 1939 6 Sheets-Sheet 2
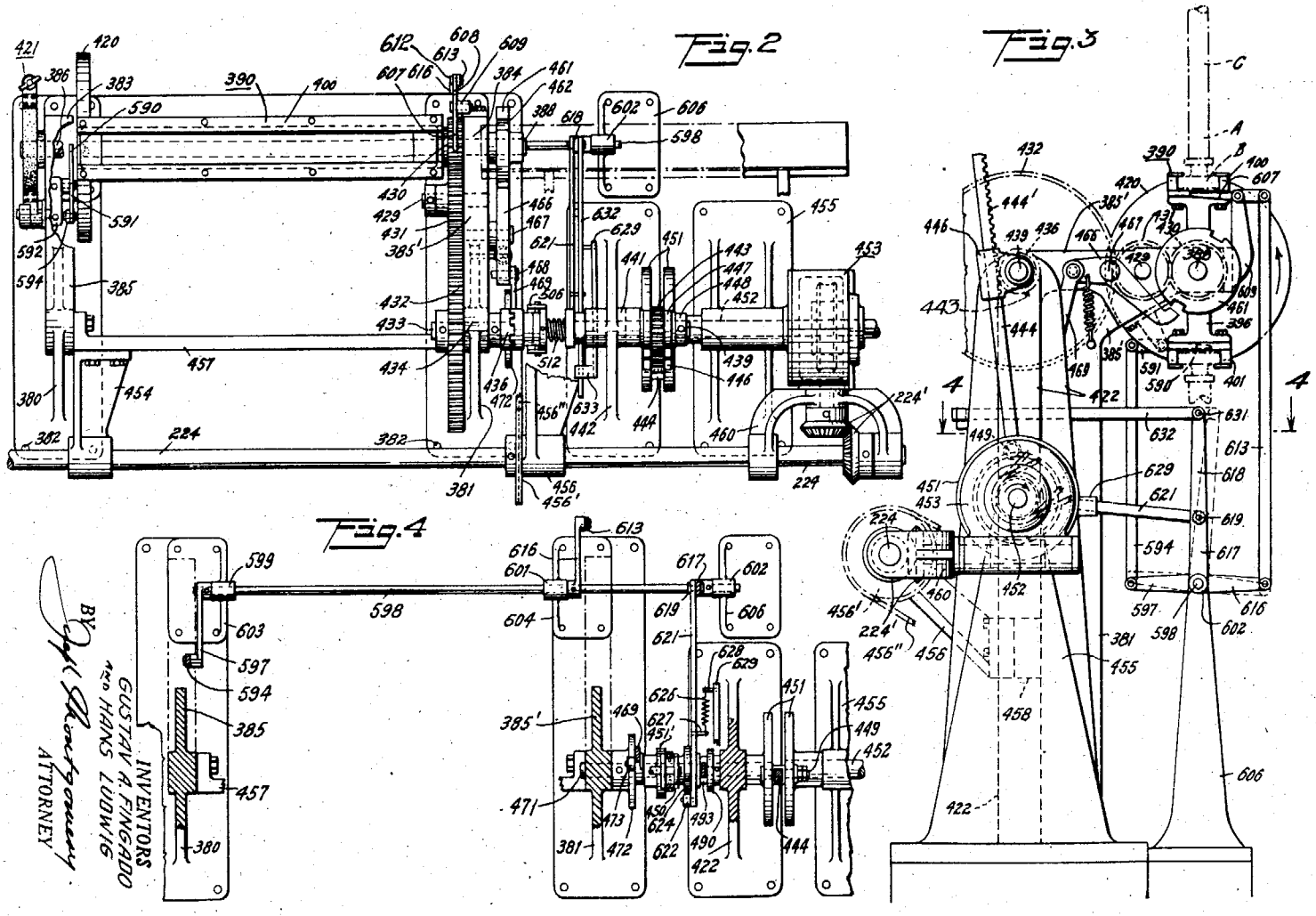
INVENTORS
GUSTAV A. FINGADO
AND HANS LUDWIG
BY Joseph Montgomery
ATTORNEY April 17, 1945. G. A. FINGADO ET AL Re. 22,631
MACHINE FOR TREATING THIN RUBBER ARTICLES
Original Filed July 1, 1939 6 Sheets-Sheet 3
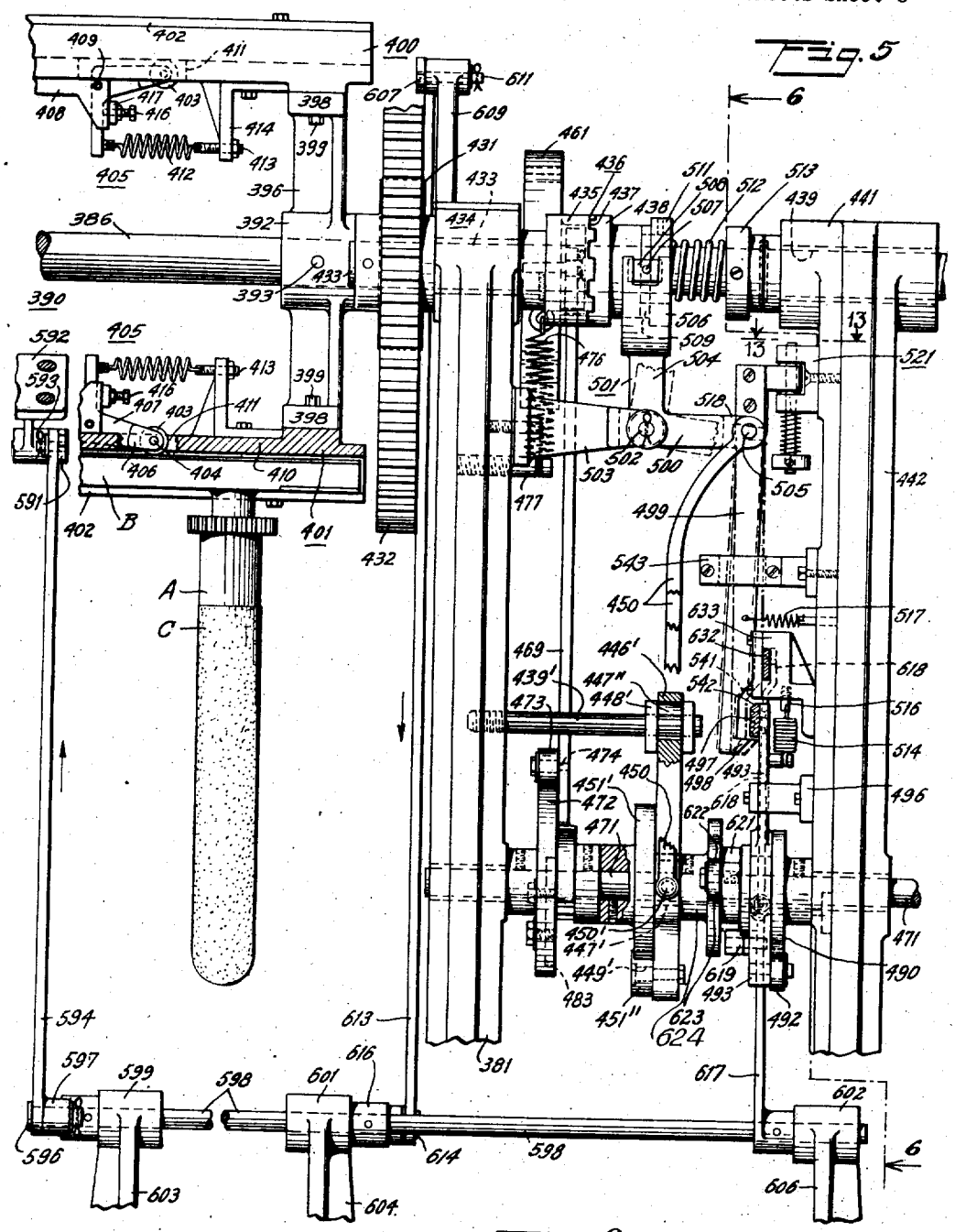
INVENTORS
GUSTAV A. FINGADO
AND HANS LUDWIG
BY
ATTORNEY April 17, 1945. G. A. FINGADO ET AL Re. 22,631
MACHINE FOR TREATING THIN RUBBER ARTICLES
Original Filed July 1, 1939 6 Sheets-Sheet 4
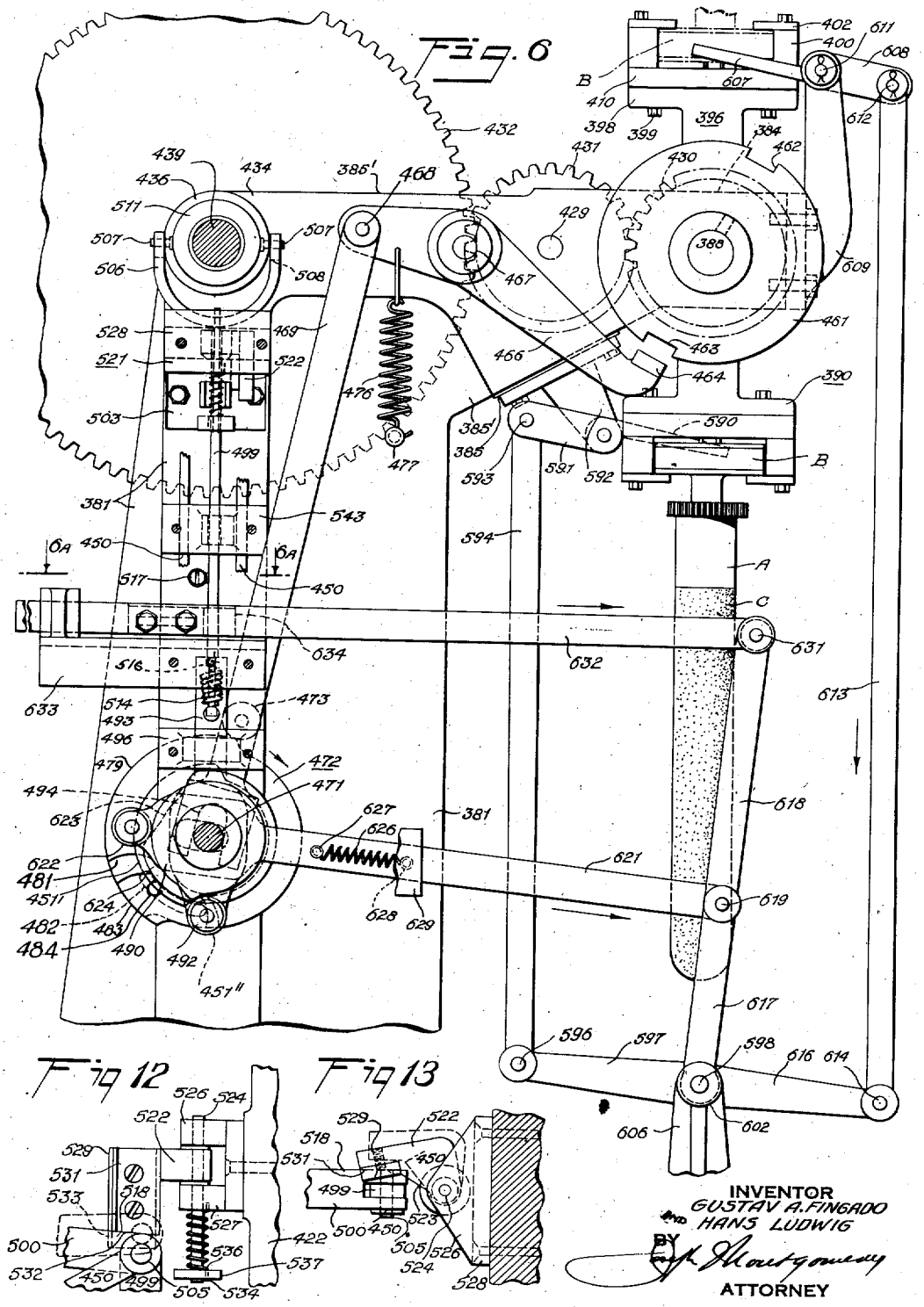
INVENTOR
GUSTAV A. FINGADO
AND HANS LUDWIG
BY
ATTORNEY April 17, 1945. G. A. FINGADO ET AL Re. 22,631
MACHINE FOR TREATING THIN RUBBER ARTICLES
Original Filed July 1, 1939 6 Sheets-Sheet 5
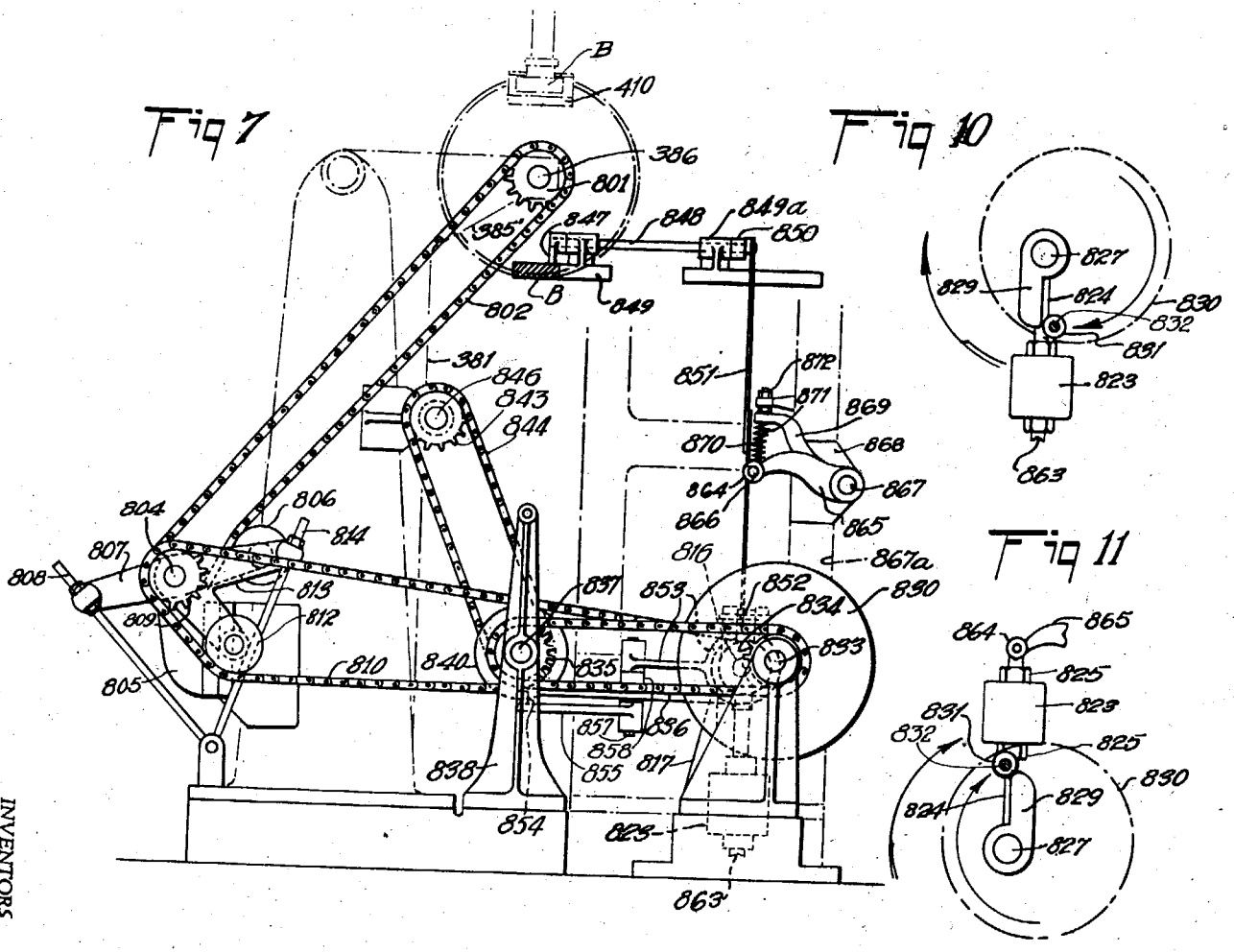
INVENTORS
GUSTAV A. FINGADO
AND HANS LUDWIG
BY Joseph Montgomery
ATTORNEY.

April 17, 1945. G. A. FINGADO ET AL Re. 22,631
MACHINE FOR TREATING THIN RUBBER ARTICLES
Original Filed July 1, 1939 6 Sheets-Sheet 6
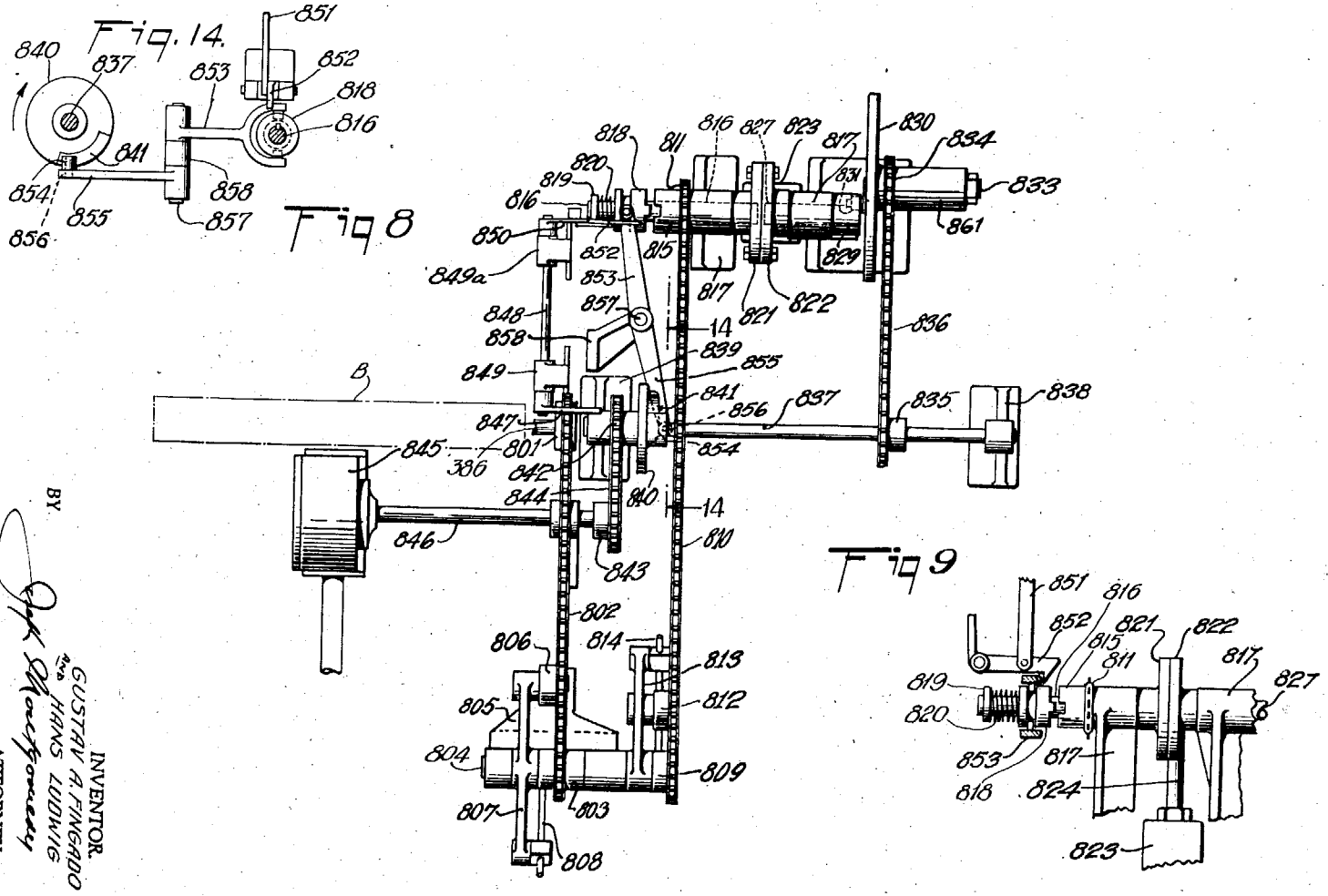
INVENTOR.
GUSTAV A. FINGADO
AND HANS LUDWIG
BY Jeff Montgomery
ATTORNEY.

Reissued Apr. 17, 1945

Re. 22,631

UNITED STATES PATENT OFFICE 22,631

MACHINE FOR TREATING THIN RUBBER ARTICLES

Gustav A. Fingado, Little Falls, and Hans Ludwig, Hohokus, N. J., assignors to Julius Schmid, Inc., New York, N. Y.

Original No. 2,288,444, dated June 30, 1942, Serial No. 282,449, July 1, 1939. Application for reissue May 18, 1944, Serial No. 536,149

9 Claims. (Cl. 18—2)

This invention relates to a machine for the treatment of thin tubular rubber articles and the like, preferably formed from liquid latex but adapted for other uses as well, and is particularly directed to an apparatus for producing such articles whereby the same will be of uniform thickness and smooth exterior surface.

In one well known method of manufacture of thin walled rubber articles, a dipping form in inverted position is lowered into liquid latex or the like and is then raised and moved into a drying or curing region. The liquid latex in this fluid state runs to the lower end of the form and accumulates there in excess amounts and if not removed before the drying or curing operation, will cause an uneven and an objectionable tip or globule of thick rubber on the article, which from a commercial point of view would lower the quality and salability of the article.

The main object of this invention is the provision of mechanism for mechanically removing excess liquid latex accumulated on the ends of the dipping forms during the manufacture of thin rubber articles or the like.

More particularly, a more specific object of this invention is the provision of mechanism for removing such excess material by means of centrifugal action.

Another object consists in the provision of a spinner rotatable on a horizontal axis and provided with two oppositely disposed form board guides; means for operating the spinner intermittently and arresting the same with the guides in a vertical plane so as to present one guide in the loading position and the opposite guide in the discharging position; means for automatically pushing a form board into the lower guide and automatically pushing a form board out of the upper guide; means for causing the spinner to be rotated a plurality of times and an extra half rotation at each operation; means for preventing an operation of the spinner in case the form boards are not in fully loaded or fully discharged position; a weight for counterbalancing a form board in the spinner and means for automatically positioning the weight to counterbalance a form board in either of the guides when that guide is in the loading position.

Other objects of the invention will appear from the following description taken in connection with the drawings, in which:

Fig. 2 is a top plan view of the mechanism disclosed in Fig. 1;

Fig. 3 is an end elevation of the mechanism as viewed in Fig. 1;

Figure 4 is a horizontal section on the line 4—4 of Fig. 3;

Fig. 5 is a fragmentary view of the right hand upper portion of Fig. 1 on an enlarged scale;

Fig. 6 is a vertical section on line 6—6 of Fig. 5;

Fig. 6a is a horizontal section on the line 6a—6a of Fig. 6;

Fig. 7 is a side elevation of a counterbalancing mechanism as viewed from the left in Fig. 1;

Fig. 8 is a top plan view of the mechanism shown in Fig. 7;

Fig. 9 is a detailed view of the clutch shown in Fig. 8 showing the pawl for holding the clutch out of engagement;

Figs. 10 and 11 illustrate the operation of the means for returning the counterbalance weight to starting position;

Fig. 12 is a side view of spinner clutch lockout mechanism;

Fig. 13 is a view taken on line 13—13 of Fig. 5; and

Fig. 14 is a vertical section on the line 14—14 of Fig. 9.

Figure 1:
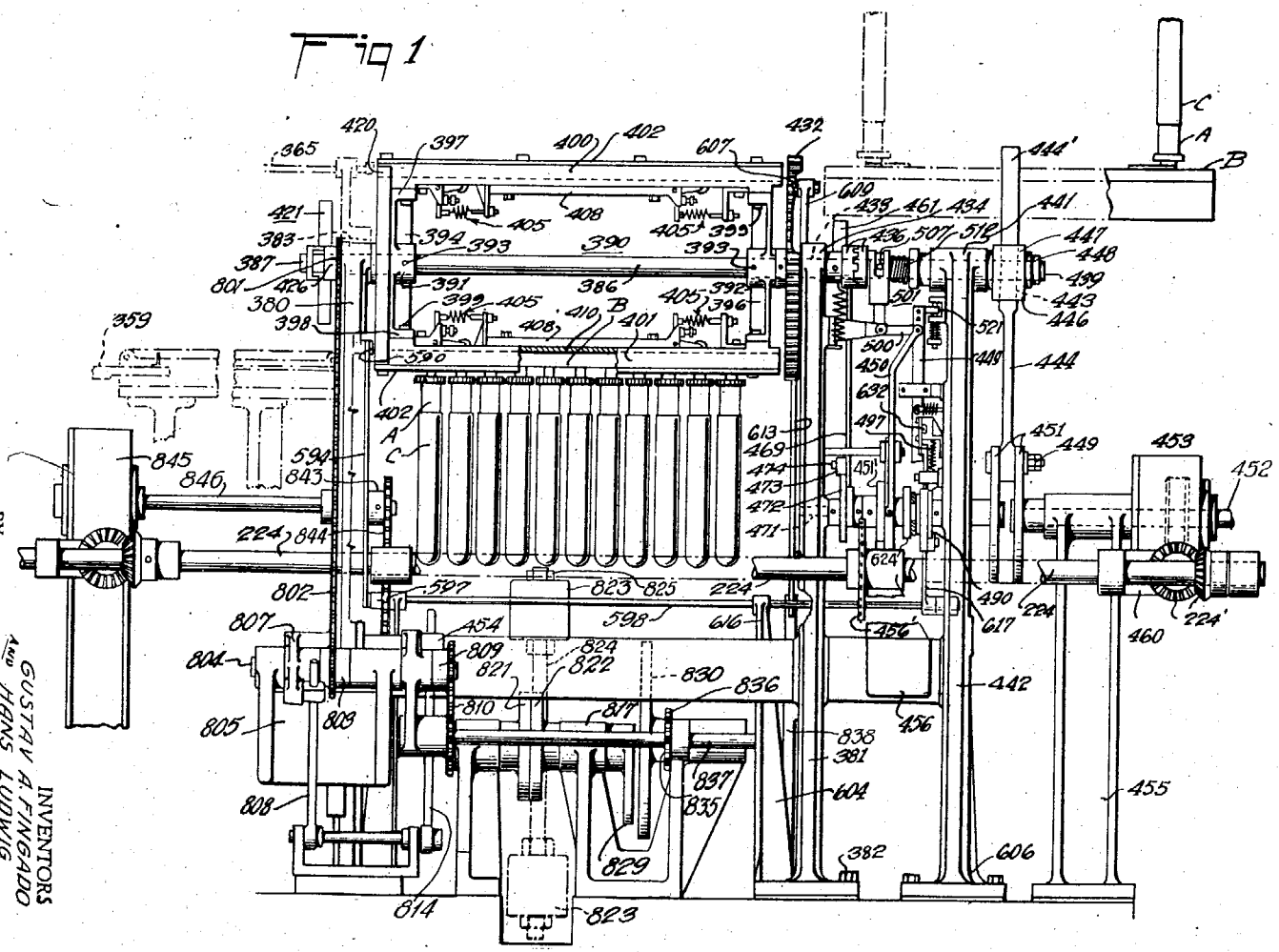
Fig. 1 is a front elevational view of the spinner mechanism.

The drawings disclose a preferred form of a spinner apparatus constructed in accordance with the principles of our invention. This apparatus is preferably used in a machine which comprises means for dipping forms and presenting them successively in loading position with respect to the spinner. The mechanism disclosed includes a spinner rotatable on a horizontal axis and provided with diametrically oppositely disposed guides in vertical alignment when the spinner is at rest, together with mechanism for rotating the spinner at a sufficient rate of speed to accomplish the purpose and means for stopping the spinner after two and one-half rotations, with the loaded guide in the discharging position and the unloaded guide in the loading position. The spinner is operated intermittently and when the spinner is at rest a transfer mechanism is operated to push a form board into the lower guide which is in the loading position and to discharge a form board out of the upper guide which is in the discharging position. The machine also includes sensing means which is operated after the transfer has been made and which comprises fingers which move across the paths of the form boards adjacent the ends of the spinner in the loading and discharging regions, and if either of the fingers senses a form board in the region in which it operates, the clutch which is used to control an intermittent operation of the spinner is moved farther into disengaging position and locked there by means which must be released manually. Mechanism such as a conventional conveyor, for example, is also provided for removing the discharged form board and transferring it into a drying chamber (not shown).

*Spinner*

The machine includes a pair of standards 380 and 381, Figs. 1 to 6, secured to the sub-frame by bolts 382 and provided, respectively, at their upper ends with forwardly extending portions 385 and 385', respectively, provided with bearings 383 and 384 in which is journaled a shaft 386 provided with extensions 387 and 388 on the outside of the standards. Mounted on the shaft 386 between the portions 385 and 385' is a spinner 390 which comprises a pair of end members consisting of hubs 391 and 392 fixed to the shaft by set screws or tapered pins 393 and provided, respectively, with pairs of radially disposed arms 394 and 396, the arms of each pair being 180° apart and terminating in flanged portions 397 and 398 to which are secured by bolts 399, longitudinally disposed form board guides 400 and 401 which lie in the same vertical plane and are aligned with the pushers of the transfer machine when the spinner is at rest.

The guides 400 and 401 are constructed and suitably proportioned to freely receive the form boards B carrying dipping forms A coated with liquid latex C, and to retain the boards against radial displacement the guides are provided with retaining plates 402 secured to the walls of the guides in positions to slightly overlie the longitudinal edges of the form boards B. The form boards B are each yieldably held against longitudinal displacement by devices 405, each including a pressure roll 403, Fig. 5, supported by a pin 404 in the bifurcated end 406 of a rocker arm 407 pivotally mounted on a bracket 408 as at 409 and secured upon the web member 410 of the guide 400 or 401.

The rolls 403 move in slots 411 in the webs of the guides and are pressed against the form boards B by tension springs 412 adjustable by nuts cooperating with screws 413 slidable in brackets 414 secured to the webs of the guides.

The rocking movement of the arm 407 upon which the roll is mounted is limited by an adjustable stop pin 416 threaded into a lug 417 integral with or otherwise secured to the bracket 408.

The receiving end of the spinner is provided with a guard member in the form of a disc 420, Figs. 1, 2 and 3, which is secured to the shaft 386 and is provided with notches receiving the ends of the form board guides 400, 401.

A motion checking device which, as illustrated, may take the form of a conventional mechanical brake 421, Figs. 1 and 2, is provided. The drum of the brake is keyed to the extension 387 of the shaft 386 while the friction elements or brake shoes are pivotally mounted at 426 on the standard 380, the free ends of the brake shoes being adjustably held together by an adjusting bolt which provides suitable frictional contact upon the surface of the drum to aid in retarding the motion of the spinner at the end of each cycle of operation of the spinner.

*Transfer mechanism*

The machine includes a transfer mechanism which comprises pusher bars 359 and 365, Fig. 1, operated automatically in timed relation to the intermittently operated spinner to move a form board B into the lower guide into the position shown in this figure and to move a form board B out of the upper guide into the position shown in this figure. Mechanism to be described later is provided to prevent an operation of the spinner if the form board in the lower guide projects out of the entrance end of this guide or if the form board discharged from the upper guide has not been pushed far enough from the exit end of the upper guide to provide safe clearance for an operation of the spinner. For purposes of description it may be assumed that the transfer mechanism and spinner control mechanisms are operated during the first half of the cycle of operation of the machine and the mechanism disclosed and that the spinner is rotated during the latter half of the cycle of operation. The drawings in Figs. 1 to 6 and 11, show the spinner and the mechanisms at the beginning of the latter half of the cycle of operation of the machine, i. e. at the beginning of a spinner operation, and Figs. 7, 8, 9, 10 and 14 the counterbalancing mechanism at the beginning of the cycle.

*Intermittent drive mechanism for the spinner*

After the transfer pusher bars 359 and 365 have been withdrawn into the position shown in Fig. 1, the spinner 390 is made to rotate two and one-half times through a spur gear 430, Figs. 2, 3 and 6, secured to the extension 388 of the shaft 386, an intermediate gear 431 rotatable upon a stub shaft 429 supported in the forwardly extending portion 385' of the standard 381 and the large driving gear 432. The latter is keyed to the end of a short shaft 433 journaled in a bearing 434 on the standard 381. The other end of the shaft 433 has secured thereon one member 435, Fig. 5, of a clutch indicated generally by the numeral 436, which has square jaws 437 adapted to freely interengage with mating jaws of clutch member 438 mounted and splined for axial movement on a shaft 439 journaled in an elongated bearing 441 in a standard 442.

The opposite end of the shaft 439 has fixed thereon a pinion 443, Figs. 1, 2 and 3, coacting with a rack bar 444 provided with a rack portion 444' held in mesh with the pinion by a guide member 446 provided with suitable journaled lugs 447 bearing upon and retained on the shaft 439 by a collar 448. The rack bar 444 is reciprocated through the medium of a crank pin 449, Fig. 1, secured to a pair of crank discs 451, Figs. 1, 2, 3 and 4, one of which is keyed to a driving shaft 452 that is synchronized with the transfer mechanism while the other crank disc has keyed thereon an extension shaft 471, Figs. 1, 4 and 6 in coaxial relation with the shaft 452.

The shaft 452 is driven through a gear reduction device 453, Figs. 1 and 2, supported on a standard 455 and which is driven through miter gears 224' associated with the power shaft 224 journaled in brackets 454, 456 and 460 and which is driven through a sprocket 456' and chain 456'' which may be driven from a countershaft of a machine of the type herein disclosed in case several machines are arranged in tandem.

Intermittent driving of the spinner 390 is obtained through a clutch controlling cam 451', Figs. 1, 5 and 6, secured to the shaft 471 and provided with a 180° rise and a 180° dwell. The peripheral cam surface of the cam cooperates with a cam roll 451'' urged into contact with the cam by a spring 512 which is the clutch engaging spring, Fig. 5. The roll 451'' is mounted on a pin 449', Fig. 5, carried by a yoke member 446'. The lower end of the yoke is slotted as at 447' to override the shaft 471, while its upper end is held in vertical alignment with the shaft by a vertical slot 447'' that overrides a guide post 439' provided with retaining collars 448'. The guide post is supported in the standard 381.

A pair of curved links 450, Figs. 1, 5 and 6, pivotally connected to the yoke 446' as at 450' extend vertically therefrom and are connected by a pin 505 to the arm 500 of a rock lever 501 supported on a pin 502 in a bracket 503 mounted on the standard 381. The other arm 504 of the rock lever is provided with a yoke 506 carrying block members 508 into which project pins 507 on a collar 509 rotatably retained in the clutch member 438 by a collar 511 secured on the slidable clutch member 438 to move the same to the right as viewed in Fig. 5, against the compression of the coiled spring 512 which abuts a collar 513 secured on the shaft 439, to disengage the teeth of the clutch members when the links 450 are pulled downward by the cam 451'. The cam 451' is so timed relative to the crank pin 449 that when the rack bar 444, Fig. 1, is starting its upward movement from the bottom dead center, the arms 450 will have been moved downwardly by virtue of the rise of the cam 451' acting upon the roll 451'', causing the clutch to be disengaged. Simultaneously, and as will be described later, the spinner will be locked and prevented from further rotation through the engagement of a locking pawl 466, Fig. 6, with locking disc 461 on the extension 388 of the shaft 386. The transfer mechanism will then be set in operation to operate the pusher bars to push a form board into the lower guide and to push a form board out of the upper guide.

At the instant that the crank pin 449 has reached top dead center and the rack bar 444 has reached its uppermost position and will be moved downwardly upon further movement of the crank pin, the locking pawl 466 will be disengaged from the locking disc 461, as will be described more in detail later, and simultaneously the clutch will re-engage for an interval of one-half rotation of the shaft 452 which rotates the spinner and completes a cycle of operation.

*Spinner positive positioning means*

As best seen in Fig. 6, the extension 388 of the spinner shaft 386 has keyed thereon adjacent to the driven end, a positive positioning or locking disc 461 provided in its periphery with locking notches 462 and 463 spaced 180° apart and which are adapted to receive a lip portion 464 on the free end of a rock lever 466 pivoted on a pin 467 in the forwardly extending portion 385' of the standard 381. Pivoted to the opposite end of the lever 466 by a pin 468 is the upper end of a cam rod 469 which is slotted at its lower end to override the cam shaft 471 (see also Fig. 5) which is rotated by the aforementioned crank discs 451, Figs. 1 and 4. Keyed to this shaft is a cam 472, Figs. 4, 5 and 6, provided with a peripheral cam surface with which coacts a cam roll 473 supported on a pin 474 on the cam rod 469. The cam roll 473 is urged into contact with the cam 472 by means of a tension spring 476, Fig. 1, secured to an arm of the rock lever 466 and to a pin 477 in the standard 381. It will be noted that the cam 472 is provided with a raised surface 479 of about 176° and the cam is provided with a timing adjustment for advancing or retarding the action of the rock lever 466. This timing means includes a recessed portion 481 in the side of the cam body which is one-half of the thickness thereof and which is provided with an arcuate slot 482. A segmental inset member 483 profiled to conform to the design of the cam is located in this recessed portion and bolts 484 coacting with the slot 482 clamp the inset member in adjusted position within the recess. The inset member 483 is shorter than the recess so that adjustment may be made in either arcuate direction, as required.

The spinner device 390 in the position shown has just been released and is about to be rotated two and one-half times when it is brought to rest and locked in position by the lock lever 466.

It is to be understood that the number of rotations of the spinner and the rate of speed thereof required are contingent upon the conditions pertaining to the solution of latex C upon the forms A and that the ratio of gearing may be changed as desired.

It will also be noted that with each rotation of the cam 472 the locking lever will be actuated to disengage from one or the other of the notches 462 and 463 and engage with the other to position and lock the spinner relative to the transfer mechanism for loading and discharging the form boards B.

*Automatic safety clutch throw-out*

An automatic safety clutch control mechanism is provided which as best seen in Figs. 1, 5, 6, 12 and 13, includes a cam 490 mounted on the shaft 471 and which actuates a cam roll 492 on a cam bar 493 guided for vertical reciprocal movement through the medium of a slot (not shown) adjacent to its lower end which overrides the shaft 471 while its upper end is slidable within a guide 496 secured to the frame 422 and has secured thereon a latch block 497 adapted to interlatch with a latch member 498 on the lower free end of a pendant rod 499 pivotally connected by the pin 505 with the clutch rock lever 501.

The cam roll 492 is held in engagement with the cam 490 by means of the tension spring 514 secured at one end by stud 516 to a guide block 533, later referred to, and at its other end to the cam bar 493 while the rod 499 is urged into engaging position with the cam rod 493 by a tension spring 517 secured to the frame 422, and accordingly when the latch member 498 on the pendant rod 499 is operatively latched with the latch block 497 of the cam rod 493, it will be moved downwardly to move the clutch member 438 through the action of cam 490 upon cam roll 492 farther to the right of its disengaged position effected by the cam 451' and before it is released by the cam 451'. The upper corner of the block 497 is beveled at 542 to cooperate with a beveled surface 541 on the pendant rod to cam the latter to the left out of the path of the cam rod 493.

While the clutch is thus disengaged the end 518, Figs. 12 and 13, of the rock lever 501 is acted upon by a locking device generally designated by the numeral 521 to prevent its upward return movement until the locking device has been released by the hand of the operator. The locking device includes a dog 522 provided with an offset portion 523 fixed on a pintle 524 journaled in the ears 526 and 527 of a supporting member 528 secured to the frame 422. The dog 522 includes a depending portion 529 which carries a stop member 531 secured thereon so as to form a shoulder 532 at its lower end, relative to the extreme lower end 533 of the depending portion 529.

The pintle 524 has an extension 534 encircled by a coiled spring 536 one end of which is secured to a collar 537 fixed to the lower end of the pintle, while its other end is anchored to the adjacent ear 527 of the adjacent supporting member 528. The locking device is so positioned relative to the end 518 of the arm 500 that the stop 531 which forms the shoulder 532 is yieldably urged against the end 518 of the arm 500 by the spring 536 and pintle 524, when the arm is moved downwardly by the clutch cam 451', but when the arm has been pulled farther downwardly by the cam 490 the dog is permitted to be further rotated to snap the shoulder 532 over the top of the end 518 of the arm 500 to an extent which is limited by engagement of the depending portion 533 with the side of the arm 500, and accordingly, the arm 500 is held in this downward position and will be prevented from returning to clutch engaging position until the safety locking device 521 has been manually released.

A guide member 543 secured to the frame 422 serves to keep the pendant rod 499 in vertical alignment with the cam rod 493 in one plane at all times.

The automatic safety clutch throw-out mechanism as described would, without any controls about to be described, operate during each operation of the machine and would prevent an operation of the spinner.

*Control for the automatic safety clutch throw-out*

This control consists of sensing fingers one of which operates through the space in front of the entrance end of the lower guide on the spinner and the other of which operates through the space at the exit end of the upper guide of the spinner, so as to determine whether a form board has been pushed into proper position in the lower guide or has been pushed far enough out of the upper guide to clear the spinner for safe operation.

These fingers are timed to be actuated about 80° in advance of the unlocking of the spinner and the engagement of the clutch.

As best seen in Figs. 2, 5 and 6, one of the fingers designated by the numeral 590 is the free end of a rock lever 591 pivotally supported on a bracket 592 secured to the frame portion 385' and actuated through a pin connection 593 with a rod 594 pivotally connected at 596 to the end of an arm 597 secured to a common rock shaft 598 journaled in bearings 599, 601, 602, Figs. 4 and 5 carried by standards 603, 604, 606, respectively mounted upon and secured to the sub-base. The other finger 607, Fig. 6 is the free end of a rock lever 608, pivoted in a bracket 609 by means of a pin 611 and actuated through a pin connection 612 with a rod 613 pivotally connected at 614 to an arm 616 secured to the rock shaft 598 intermediate of its ends.

The rock shaft 598, Figs. 3, 4 and 6, is yieldably oscillated through the medium of a vertically disposed arm 617 secured thereto and which has an extension 618, presently to be described. The arm 617 has a pivotal connection 619 with one end of a cam rod 621. This cam rod is slotted at the opposite end to override the cam shaft 471 and is provided with a roll 622 for cooperation with the cam surface 623 of a cam 624 on the cam shaft 471. The surface of the cam is such as to withdraw the fingers and to hold them withdrawn during the transfer operation and to release them after the transfer operation has been completed, so as to permit the fingers to be moved through the spaces traversed by the form boards. This movement is effected by a heavy tension spring 626 secured to the cam bar 621 as at 627 and to a pin 628 in the supporting member 629 secured to the machine standard 422. This movement is timed to take place just before the cam 490 becomes effective.

To the upper end of the extension 618, Fig. 6, of the arm 617 is pivotaly connected by a pin 631 one end of a cam bar 632, see also Fig. 5, the opposite end of which is slidably supported in the bracket 633 secured to the frame 422. The bar 632 is slidably positioned adjacent to one edge of the pendant rod 499 and is provided with a cam block 634, Fig. 6a, which when the bar is moved to the right engages the rod 499 to disengage the cam latches 497 and 498, so as to disable the automatic safety clutch throw-out mechanism and permit the main clutch operating mechanism to function to engage the clutch and permit operation of the spinner, in case the sensing fingers are free to move through the spaces adjacent the guides, as before explained. If either of the form boards is not in a proper position at the end of the transfer operation, then the movement of the fingers will be obstructed and the cam bars 632 will not move to the right, with the result that the automatic safety clutch throw-out mechanism will be operative to move the clutch farther to the right, in which position it will be locked until it is manually released.

*Counterbalancing mechanism*

It will be noted that with a form board in the spinner the spinner is out of balance. When the spinner rotates, centrifugal force will cause destructive forces to be set up in the whole unit unless the form board is counterbalanced during the spinning cycle. At the same time, when no form board is in the spinner the counterbalancing mechanism must be kept out of action to prevent destructive strains in the mechanism. The device is so constructed that if a form board is pushed into the spinner to be spun around, the counterbalance weight is connected to the spinner in counterbalancing relation to the form board and therefore counteracts the centrifugal forces set up by the form board, and when no form board enters the spinner the counterbalance weight remains disconnected during the spinning cycle. The counterbalancing mechanism is disclosed in Figs. 7 to 10 and 14. The parts are shown in the position at the end of a spinning cycle, i. e., at the beginning of a cycle of operation of the machine.

Attached to the left hand end of the spinner shaft 386, Figs. 1, 7 and 8, is a sprocket 801 connected by a chain 802 to a sprocket 803 keyed to a shaft 804 journaled in a bracket 805. The chain is kept tight by an idler sprocket 806 supported on a lever 807 which is adjusted by a rod 808. Keyed to the shaft 804 is a sprocket 809 over which passes a chain 810 which also passes over a sprocket 811, and the chain is kept tight by an idler 812 supported on a bell crank lever 813 made adjustable by a rod 814. Connected to the sprocket 811 is a straight jaw female clutch member 815, Fig. 8, rotatably supported on a shaft 816 journaled in a bracket 817. Mounted on the shaft 816 and slidably splined to it is the male clutch member 818, see also Figs. 9 and 14, backed up by a collar 819 on the shaft and a spring 820. The clutch controlling means will be described later.

Keyed to a shaft 816 is a disc 821 which is fastened to a counterbalance weight carrying disc 822 by means of bolts. The disc 822 supports a counterbalance weight 823 which is adjustable radially on a rod 824, Figs. 9, 10 and 11, by means of nuts 825. The disc 822 is keyed to a shaft 827 which is also supported in the bracket 817. Attached to the shaft 827 is a counterbalance weight restoring arm 829 operated by mechanism about to be described.

By means of the mechanism described it will be seen that the spinner shaft 386 rotates the counterbalance weight when the jaw clutch 818 is engaged with the clutch member 815.

Also supported on the bracket 817 in offset relation to the disc 822 is a counterbalance weight restoring disc 830 which supports a roller 831 on a pin 832 carried thereby. This roller cooperates with the arm 829 to reset the counterbalance weight. The disc 830 is keyed to a shaft 833 supported in a bracket bearing 861 on the bracket 817. Fastened to the disc 830 is a sprocket 834 which is driven from a sprocket 835 through a chain 836. The sprocket 835 is mounted on a shaft 837 supported by brackets 838 and 839. Also mounted on the shaft 837 is a clutch operating cam 840 which is provided with lobe 841 and which will be more fully described later. Also keyed to the shaft 837 is a sprocket 842 which is driven from a sprocket 843 through a chain 844. The sprocket 843 is driven from the main shaft 224 by reduction box 845 through shaft 846 on which it is mounted. The reduction box 845 also drives the transfer mechanism which slides the form board into the spinner frame. Since the transfer mechanism and the spinner reduction boxes are driven from a common shaft 224, they are also in timed relation with one another and therefore the interrelationship between the spinner, transfer mechanism and the counterbalancing mechanism can be maintained at all times. By means of the mechanism described, the clutch controlling cam and the counterweight resetting arm are continuously rotated and are rotated once during each cycle of the machine.

*Counterbalance clutch control*

When a form board is pushed in the spinner by the pusher bar 359 of the transfer mechanism the leading end of the form board comes into contact with an arm 847, Figs. 7 and 8 pinned to a shaft 848 supported by brackets 849 and 849*a*. Pinned to the shaft 848 is a lever 850 to the end of which is attached by means of a stud, one end of a link 851, the other end of which is connected to a latch 852, Fig. 9. Thus when the form board comes into contact with the arm 847 it lifts the latch 852 free from the yoke 853 which permits the clutch member 818 to move toward the clutch member 815 when released by the cam 840, Fig. 14.

The cam 840 is so timed with relation to the stroke of the transfer arm which moves the form board, that the lobe 841 of the cam remains in contact with a roller 854 supported on a lever 855 by a stud 856 for about one-third of the stroke of the form board. The lever 855 is pinned to a shaft 857 supported in a bracket 858. Also pinned to the shaft 857 is a clutch yoke 853 and when the roller 854 is engaged by the lobe 841 of the cam 840 at the end of a spinner operation it causes the yoke to disengage the clutch member 818 and to move it past the latch so as not to interfere with the raising of the latch when a form board is pushed into the lower guide. When the latch is raised the spring 820 will move the clutch member 818 toward the clutch member 815 when the roller 854 rolls off the lobe 841 of the cam and when the counterbalancing weight has been reset by the mechanism described, the clutch member 818 will interengage with the clutch member 815 and connect the counterbalancing weight to the spinner, as previously described.

At the beginning of every spinning cycle in a continuous loaded operation a form board will be in the lower guide of the spinner and therefore it will be necessary for the counterbalance weight 823 which at the end of the previous cycle was left at the bottom of the circle, Fig. 10, to be moved to the top of the circle, Fig. 11. By means of mechanism described and to be again subsequently referred to, the counterbalance weight is reset to this position by the beginning of every spinning cycle and is picked up and makes two and one-half revolutions during each spinning cycle.

At the end of the spinning cycle it is necessary to disconnect the counterbalance weight from the spinner and this is accomplished by the cam 840, Fig. 14. The cam 840 makes one rotation for each spinning cycle and therefore when the lobe 841 comes into contact with the roller 854 just before the end of the spinning cycle, it disengages the clutch jaw 818 from the jaw 815 and so disconnects the counterbalance weight from the spinner.

During the operation of the transfer mechanism the counterbalance weight 823 must be returned to the top of the circle since at the end of the spinning cycle the weight stops at the bottom of the circle, Figs. 1, 7 and 8 and is in counterbalancing relation to the form board which is at the top of the spinner and about to be discharged.

The position of the counterbalance weight 823 at the end of the spinning operation is shown in Fig. 10, and it is returned to the position shown in Fig. 11 by the roll 831, before described, which engages the arm 829 and moves the arm into the position shown in Fig. 11, raising the counterbalance weight 823 to the position shown in this figure. The weight 823 is now in counterbalancing relation with respect to a form board that may be pushed into the lower guide on the spinner. The shafts 833 and 827 are offset vertically and horizontally so that the roller 831, as it moves from the position shown in Fig. 11 to that shown in Fig. 10 during a spinning operation, will not obstruct the rotation of the arm 829 and the counter-weight during the operation of the spinner.

In order that the counterweight 823 may be held in the position shown in Fig. 11, the end of the rod 824 is notched at 863 into which a roller 864 on an arm 865 is pushed as the counterweight moves into the position shown in Fig. 11. The roller 864 is supported on the arm 865 by a pin 866. The arm 865 is pivoted on a shaft 867, Fig. 7, which is journaled in a bracket 868 fastened to the transfer frame 867*a*. Pinned to the shaft 867 is a yoke 869 which forms a rigid backing for a spring 870 which surrounds a rod 871 and the spring is put under compression by means of a washer held in position by a cotter pin passing through the rod 871. Lock nuts 872 regulate the position of the roller 864 with respect to the notch 863 on the counterweight rod 824. The roller is so positioned as to just hold the counterweight from falling of its own accord when it is at the top of the circle, as shown in Fig. 11, and yet is free enough to offer no substantial resistance to the rotation of the counterweight. Thus it can be seen that the counterweight is always returned to the top half of the circle after each spinning cycle and held there in readiness for the ensuing spinning cycle.

As the counterbalance clutch is released by a form board as it is pushed into a guide on the spinner, it is obvious that if the spinner is operated without a form board that the counterbalancing mechanism will not be connected to the spinner shaft. Hence no unbalanced weight will be spun which might cause damage to the spinning mechanism.

What is claimed is:

1. In a machine for removing by centrifugal action excess material in a fluid state accumulated on the end of dipped forms, the combination of an elongated spinner, a shaft extending longitudinally through the center of said spinner for rotation of the spinner about its axis, form board guides extending longitudinally along the periphery of said spinner, form boards slidable into and out of said guides, dipping forms mounted on said boards and extending laterally with respect to the spinner with the free ends outermost, means for rotation of said spinner at a speed to produce a centrifugal force on said excess material of sufficient value to remove said excess material, said means automatically spinning said spinner and stopping the same after said excess material has been removed, and means for ejecting said form boards from said guides.

2. In mechanism for removing by centrifugal action excess material massed on the end of an inverted dipped form, the combination of an elongated spinner, a shaft extending longitudinally through the center of said spinner for rotation of the same about a horizontal axis, form board guides extending longitudinally along the periphery of said spinner, form boards, dipping forms mounted on said boards in inverted position on the lower side of said spinner and extending in a radial direction with the free ends lowermost, automatic means for rotaing said spinner and accelerating its speed to create sufficient centrifugal force to remove said excess material and for decelerating the speed of rotation of the spinner and stopping it with the forms on the upper side of said spinner, and means for ejecting said form boards from said guides.

3. In a machine for removing by centrifugal action excess material in a fluid state accumulated on the ends of dipped forms, the combination of an elongated spinner, a shaft extending longitudinally through the center of said spinner for rotation of the same about a horizontal axis, two diametrically oppositely located form board guides extending longitudinally along the periphery of said spinner with one on the lower side of the spinner in a loading position and the other on the upper side of the spinner in a discharging position when the machine is at rest, form boards slidably positioned in said guides, a plurality of forms rigidly secured to said form boards and extending radially of said spinner, a transfer mechanism for pushing a form board into the lower guide and a form board out of the upper guide, automatic means for rotating the spinner after the transfer operation has been effected to produce a centrifugal force on said excess material of sufficient value to remove said excess material, and automatic means for starting said spinner and for stopping the same after said excess material has been removed with the loaded guide in the discharging position and the unloaded guide in the loading position.

4. In a machine for removing by centrifugal action excess material in a fluid state accumulated on the ends of dipped forms, the combination of an elongated spinner, a shaft extending longitudinally through the center of said spinner for rotation of the same about a horizontal axis, two diametrically oppositely located form board guides extending longitudinally along the periphery of said spinner with one on the lower side of the spinner in a loading position and the other on the upper side of the spinner in a discharging position when the machine is at rest, form boards slidably positioned in said guides, a plurality of forms rigidly secured to said form boards and extending radially of said spinner, a transfer mechanism for pushing a form board into the lower guide and a form board out of the upper guide, automatic means for rotating the spinner after the transfer operation has been effected to produce a centrifugal force on said excess material of sufficient value to remove said excess material, automatic means for starting said spinner and for stopping the same after said excess material has been removed with the loaded guide in the discharging position and the unloaded guide in the loading position, and sensing means operable across the paths traversed by the form boards in regions adjacent the ends of the guides and after the transfer operation has been effected for controlling the disabling of said spinner rotating means.

5. In a machine for removing by centrifugal action excess material in a fluid state accumulated on the ends of dipped forms, the combination of an elongated spinner, a shaft extending longitudinally through the center of said spinner for rotation of the same about a horizontal axis, two diametrically oppositely located form board guides extending longitudinally along the periphery of said spinner with one on the lower side of the spinner in a loading position and the other on the upper side of the spinner in a discharging position when the machine is at rest, form boards slidably positioned in said guides, a plurality of forms rigidly secured to said form boards and extending radially of said spinner, a transfer mechanism for pushing a form board into the lower guide and a form board out of the upper guide, automatic means for rotating the spinner after the transfer operation has been effected to produce a centrifugal force on said excess material of sufficient value to remove said excess material, automatic means for stopping said spinner after said excess material has been removed with the loaded guide in the discharging position and the unloaded guide in the loading position, said rotating means comprising a normally disengaged clutch and means for engaging said clutch and control means comprising sensing means operable across the paths traversed by said form boards in regions adjacent the ends of said guides and operable when obstructed by a form board to control disabling of said engaging means.

6. In a machine for removing by centrifugal action excess material in a fluid state accumulated on the ends of dipped forms, the combination of an elongated spinner, a shaft extending longitudinally through the center of said spinner for rotation of the same about a horizontal axis, two diametrically oppositely located form board guides extending longitudinally along the periphery of said spinner with one on the lower side of the spinner in a loading position and the other on the upper side of the spinner in a discharging position when the machine is at rest, form boards slidably positioned in said guides, a plurality of forms rigidly secured to said form boards and extending radially of said spinner, a transfer mechanism for pushing a form board into the lower guide and a form board out of the upper guide, automatic means for rotating the spinner after the transfer operation has been effected to produce a centrifugal force on said excess material of sufficient value to remove said excess material, automatic means for stopping said spinner after said excess material has been removed with the loaded guide in the discharging position and the unloaded guide in the loading position, said rotating means comprising a normally disengaged clutch, means operable to engage and disengage said clutch, a second clutch operating means operable to move said clutch into disengaging positions, means for holding said clutch when operated by said second clutch operating means in disengaged position, and sensing means operable across the paths of said form boards after the transfer operation has been effected and disabling when unobstructed said second clutch operating means.

7. In a machine for removing by centrifugal action excess material in a fluid state accumulated on the ends of dipped forms, the combination of an elongated spinner, a shaft extending longitudinally through the center of said spinner for rotation of the same about a horizontal axis, two diametrically oppositely located form board guides extending longitudinally along the periphery of said spinner with one on the lower side of the spinner in a loading position and the other on the upper side of the spinner in a discharging position when the machine is at rest, form boards slidably positioned in said guides, a plurality of forms rigidly secured to said form boards and extending radially of said spinner, a transfer mechanism for pushing a form board into the lower guide and a form board out of the upper guide, automatic means for rotating the spinner after the transfer operation has been effected to produce a centrifugal force on said excess material of sufficient value to remove said excess material, automatic means for stopping said spinner after said excess material has been removed with the loaded guide in the discharging position and the unloaded guide in the loading position, and a counterbalance weight and means for connecting said weight in counterbalancing relation to form boards loaded alternately into said guides.

8. In a machine for removing by centrifugal action excess material in a fluid state accumulated on the ends of dipped forms, the combination of an elongated spinner, a shaft extending longitudinally through the center of said spinner for rotation of the same about a horizontal axis, two diametrically oppositely located form board guides extending longitudinally along the periphery of said spinner with one on the lower side of the spinner in a loading position and the other on the upper side of the spinner in a discharging position when the machine is at rest, form boards slidably positioned in said guides, a plurality of forms rigidly secured to said form boards and extending radially of said spinner, a transfer mechanism for pushing a form board into the lower guide and a form board out of the upper guide, automatic means for rotating the spinner after the transfer operation has been effected to produce a centrifugal force on said excess material of sufficient value to remove said excess material, automatic means for stopping said spinner after said excess material has been removed with the loaded guide in the discharging position and the unloaded guide in the loading position, a counterbalancing mechanism comprising a rotatable counterbalance weight, a driving connection between said spinner and counterbalancing mechanism comprising a clutch, means for automatically connecting said weight alternately in counterbalancing relation to the form boards alternately loaded into said guide, and means operable by a form board as it is pushed into a guide to cause said clutch to be engaged.

9. In a machine for removing by centrifugal action excess material in a fluid state accumulated on the ends of dipped forms, the combination of an elongated spinner, a shaft extending longitudinally through the center of said spinner for rotation of the same about a horizontal axis, diametrically oppositely located form board guides extending longitudinally along the periphery of said spinner with one in a loading position and the other in a discharging position when the machine is at rest, form boards slidably positioned in said guides, a plurality of forms rigidly secured to said form boards and extending radially of said spinner, transfer means for pushing a form board into the guide in the loading position and a form board out of the guide in the discharging position, automatic means for rotating the spinner after the operation of said transfer means has been effected to produce a centrifugal force on said excess material of sufficient value to remove said excess material, and automatic means for stopping said spinner after said excess material has been removed with the loaded guide in the discharging position and the unloaded guide in the loading position.

GUSTAV A. FINGADO.
HANS LUDWIG.

8

CERTIFICATE OF CORRECTION.

Reissue No.22,631. April 17, 1945.

GUSTAV A. FINGADO, ET AL.

It is hereby certified that error appears in the above numbered patent requiring correction as follows: In the grant, lines 1 and 2, for "GUSTAV A. FINGADO, of Little Falls, and HANS LUDWIG, of Hohokus, New Jersey" read --GUSTAV A. FINGADO, of Hohokus, and HANS LUDWIG, of Little Falls, New Jersey--; and in the heading to the printed specification, lines 4 and 5, for "Gustav A. Fingado, Little Falls, and Hans Ludwig, Hohokus, N. J." read --Gustav A. Fingado, Hohokus, and Hans Ludwig, Little Falls, N. J.--; and that the said Letters Patent should be read with this correction therein that the same may conform to the record of the case in the Patent Office.

Signed and sealed this 3rd day of July, A. D. 1945.

Leslie Frazer (Seal) Acting Commissioner of Patents.